United States Patent [19]

Kanao

[11] Patent Number: 5,390,704
[45] Date of Patent: Feb. 21, 1995

[54] SYNTHETIC RESIN PIPE INCLUDING CYLINDRICAL INNER WALL AND A SPIRALLY EXTENDING CORRUGATED OUTER WALL

[76] Inventor: Shiro Kanao, 9-18, Nanpeidai 4-chome, Takatsuki-shi, Osaka, Japan

[21] Appl. No.: 163,074
[22] Filed: Dec. 8, 1993

[30] Foreign Application Priority Data

Dec. 9, 1992 [JP] Japan .................. 4-352611

[51] Int. Cl.6 .............................................. F16L 11/11
[52] U.S. Cl. ............................... 138/121; 138/122; 138/133; 138/134; 138/154; 138/173
[58] Field of Search ............... 138/121, 122, 133, 134, 138/105, 154, 153, 172, 174, 178, 173, 129

[56] References Cited

U.S. PATENT DOCUMENTS

| | | | |
|---|---|---|---|
| 4,628,966 | 12/1986 | Kanao | 138/133 |
| 4,838,317 | 6/1989 | Andre et al. | 138/122 |
| 4,862,924 | 9/1989 | Kanao | 138/154 |
| 5,007,462 | 4/1991 | Kanao | 138/122 |
| 5,046,531 | 9/1991 | Kanao | 138/122 |
| 5,191,916 | 3/1993 | Kanao | 138/122 |

FOREIGN PATENT DOCUMENTS 61-141889 9/1986 Japan.

*Primary Examiner*—James E. Bryant, III
*Attorney, Agent, or Firm*—Sughrue, Mion, Zinn, Macpeak & Seas

[57] ABSTRACT

A pressure-withstanding synthetic resin pipe includes an inner wall of a synthetic resin and an outer wall of a synthetic resin. A metallic reinforcement belt plate having an inverted U-shaped sectional contour and a flat, metallic belt plate having ends bent to form engagement portions and adapted to be engaged with open end portions of the metallic reinforcement belt plate are disposed between the inner wall and a protruded corrugation portion of the outer wall.

5 Claims, 5 Drawing Sheets

SYNTHETIC RESIN PIPE INCLUDING CYLINDRICAL INNER WALL AND A SPIRALLY EXTENDING CORRUGATED OUTER WALL

BACKGROUND OF THE INVENTION

The present invention relates to a synthetic resin pipe having excellent pressure-withstanding properties against inner/outer pressures, which is used mainly as a city water pipe, a sewage pipe, various kinds of fluid transportation pipes, an underdrain pipe, a cable protective pipe and so forth, each of which is embedded in the underground. More particularly, the present invention relates to a synthetic resin pipe preferably employable as a city water pipe and a high pressure fluid transportation pipe.

A synthetic resin pipe in which a pipe wall has a metallic belt plate exhibiting a U-shaped cross-section embedded therein so as to improve properties withstanding flattening pressures has been already proposed by the present applicant and applications for such pressure-withstanding synthetic resin pipes were filed with the Japanese Patent Office by the applicant. At present, some applications have been already laid open (for example, see Japanese Utility Model Unexamined Publication No. Sho 61-141889).

Such publicly known synthetic resin pipe in which a pipe wall has a metallic belt plate exhibiting a U-shaped cross-section embedded therein, has been commercialized as synthetic resin pipe having excellent properties withstanding flattening pressures, and has been taken seriously and been widely used in various utilization fields.

Figure 11:
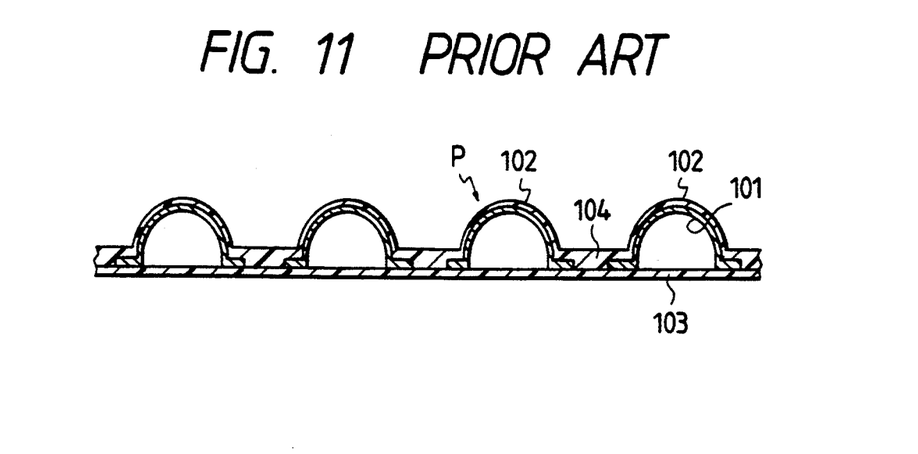
FIG. 11 is a sectional view showing a conventional pressure-withstanding synthetic resin pipe.

However, even with this synthetic resin pipe in which a wall has a metallic reinforcement belt plate exhibiting a U-shaped section embedded therein, from the results derived from a series of tests conducted for checking a flattening strength of the pressure-withstanding synthetic resin pipe under the influence of a high load of 3000 kg/m exerted on the upper surface thereof, it has been found that the pipe has a problem that the strength of the synthetic resin pipe is not always satisfactory. For example, a series of tests for checking the flattening strength of a synthetic resin pipe P constructed as shown in FIG. 11 under the condition of an outer load of 3000 kg/m exerted thereon (wherein the synthetic resin pipe P was such that a raw material of synthetic resin employed therefor was polyethylene, an outer diameter of the synthetic resin pipe was 880 mm, an inner diameter of the pipe was 800 mm, an inner pipe wall 103 located inside a top portion 102 had a thickness of 2 mm, a synthetic resin at the top portion 102 had a thickness of 3 mm, an iron plate 1 had a thickness of 1 mm, a distance between open ends of the iron plate 101 was 61 mm, and a sample P of synthetic resin pipe to be tested had a length of 1 m) were conducted, and it was found as the results derived from the tests that a quantity of deformation of the synthetic resin pipe P (i.e., a quantity of sinking) from the no-load state (i.e., the state that the synthetic resin pipe P exhibited a true circle) was 44 mm, the distance between side portions of the pipe at the open ends of the iron plate 101 was enlarged, the inner pipe wall 103 located inside the top portion 102 was elongated in the axial direction of the pipe, and cracks occurred on parts of the inner pipe wall 103. However, any abnormality was not recognized with a bottom portion 104 between the adjacent top portions 102.

SUMMARY OF THE INVENTION

The present invention has been made in consideration of the aforementioned problem inherent to the conventional pressure-withstanding synthetic resin pipe having a metallic belt plate embedded in a pipe wall thereof and its object resides in providing a pressure-withstanding synthetic resin pipe exhibiting excellent performances withstanding flattening pressures.

According to a first aspect of the present invention, there is provided a pressure-withstanding synthetic resin pipe in which a pipe wall includes a substantially cylindrical inner wall and an outer wall exhibiting a spirally extending corrugated configuration, wherein a metallic reinforcement belt plate having a substantially U-shaped sectional contour and a metallic belt plate having end portions located at open end portions of the metallic reinforcement belt plate and bent to form engagement portions to be engaged with the open end portions of the metallic reinforcement belt plate, are disposed inside the inner wall and a protruded corrugation portion of the outer wall. With this construction, the metallic belt plate regulates and prevents the metallic reinforcement belt plate from expanding and deforming at the open end portion side thereof, and further the metallic belt plate receives an outer force exerted on the metallic reinforcement belt plate, whereby the synthetic resin pipe can satisfactorily stand against a higher intensity of outer pressure.

In addition, according to a second aspect of the present invention, there is provided a pressure-withstanding synthetic resin pipe in Which a pipe wall includes a substantially cylindrical inner wall and an outer wall having a spirally extending corrugated configuration, wherein a metallic reinforcement belt plate having a substantially U-shaped section and open end portions being axially outwardly or inwardly bent to form protruded edge portions, and a flat metallic belt plate are disposed inside the inner wall and a protruded corrugation portion of the outer wall. The flat metallic belt plate is located at the side of the open end portions of the metallic reinforcement belt plate to connect one of the open end portions to the other. Opposite end portions of the flat belt plate overlap on the protruded edge portions and the overlapped portions are adhered to each other. With this construction, the adhering strength of the flat metallic belt plate regulates and prevents the open end portions of the metallic reinforcement belt plate from extending and deforming, and moreover, the metallic belt plate receives an outer pressure exerted on the metallic reinforcement belt plate through the protruded edge portions so that the pipe can satisfactorily stand against a higher intensity of the outer pressure.

A polyethylene, polyvinyl chloride, polypropylene or a similar synthetic resin prepared into a belt plate having a predetermined width and a predetermined thickness is selectively used as a raw material for forming the pressure-withstanding synthetic resin pipe P in view of a diameter of the pressure-withstanding synthetic resin pipe P and pressure-withstanding properties of the same. In addition, a plate of iron, steel, stainless steel or a similar metallic material having a predetermined width and a thickness ranging from 0.2 mm to 2.0 mm is selectively used as a raw material to be employed for the metallic reinforcement belt plate and the metallic belt plate.

According to the present invention, one or both surfaces of each of the metallic reinforcement belt plate and the metallic belt plate may be coated with a synthetic resin or a synthetic resin based paint as desired. Outer circumferential portions of the outer wall may be covered with a layer formed of a different kind of synthetic resin so as to allow the pressure-withstanding synthetic resin pipe P to exhibit a substantially cylindrical configuration. In the case that metallic plates are coated with synthetic resin materials, they can immovably be connected to each other or to pipe forming resin materials by heating and fusing the coated synthetic resin materials.

With the pressure-withstanding synthetic resin pipe constructed according to the first aspect of the present invention in the above-described manner, the engagement portions of the metallic belt plate satisfactorily prevents the open end portions of the metallic reinforcement belt plate from axially expanding and deforming when a high intensity of outer pressure is exerted on the metallic reinforcement belt plate of the pressure-withstanding synthetic resin pipe. At the same time, the metallic belt plate itself stands against an inner pressure so as to prevent a part of the inner wall located inside the projected portion of the pipe wall from axially expanding and deforming.

In addition, in the pressure-withstanding synthetic resin pipe constructed according to the second aspect of the present invention, the flat metallic belt plate overlapped on and adhered to the protruded edge portions protruded from the open end portions of the metallic reinforcement belt plate satisfactorily prevents by the surface adhesion of both the metallic plates the open end portions of the metallic reinforcement belt plate from axially expanding and deforming when a high intensity of outer pressure is exerted on the pressure-withstanding synthetic resin pipe. At the same time, the flat metallic belt plate itself stands against an inner pressure so as to prevent a part of the inner wall located inside each projected portion of the pipe wall from axially expanding and deforming.

DETAILED DESCRIPTION OF THE PREFERRED EMBODIMENTS

The present invention will now be described in detail hereinafter with reference to the accompanying drawings which illustrate preferred embodiments thereof.

Figure 1:
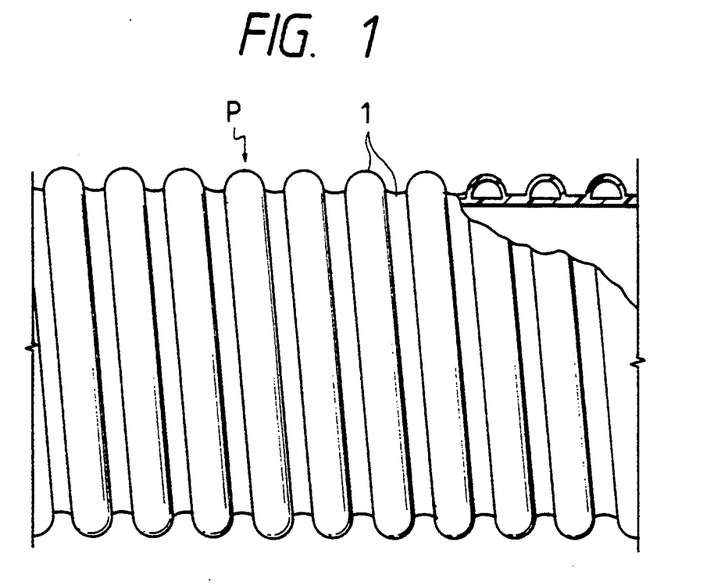
FIG. 1 is a partially exploded front view showing a pressure-withstanding synthetic resin pipe according to a first embodiment of a fist aspect of the present invention.
Figure 2:
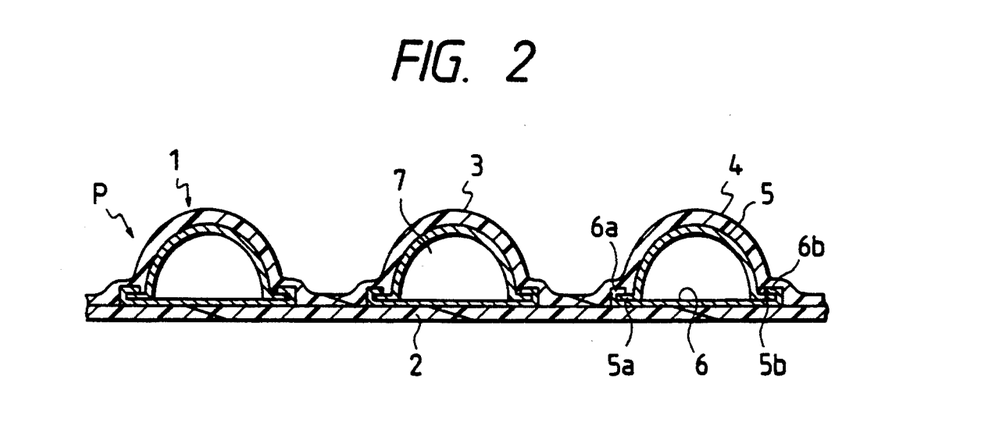
FIG. 2 is a sectional view showing the structure of a pipe wall portion of the pressure-withstanding synthetic resin pipe shown in FIG. 1.
Figure 3:
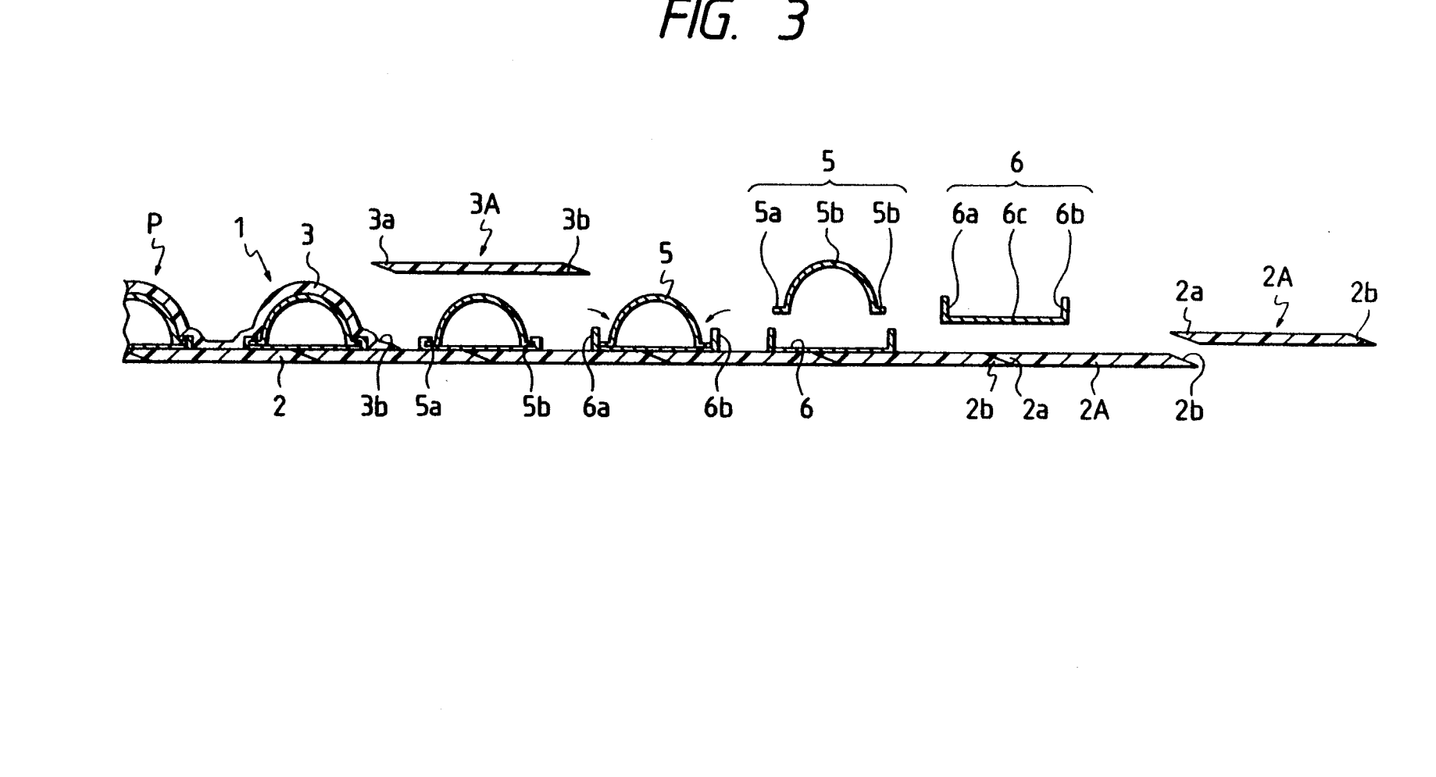
FIG. 3 is a sectional view for explaining a means for producing the pressure-withstanding synthetic resin pipe shown in FIG. 1.

FIG. 1 to FIG. 7 show a pressure-withstanding synthetic resin pipe according to a first aspect of the present invention, respectively. Among the drawings, FIG. 1 to FIG. 3 show a pressure-withstanding synthetic resin pipe according to a first embodiment of the present invention. FIG. 1 is a partially exploded sectional view showing the pressure-withstanding synthetic resin pipe P, and FIG. 2 is a sectional view showing the structure of a pipe wall 1 portion of the pressure-withstanding synthetic resin pipe P. FIG. 3 is a sectional view showing in a disassembled state a series of steps for producing the pressure-withstanding synthetic resin pipe P.

As is best seen in FIG. 2, in this embodiment, the pressure-withstanding synthetic resin pipe P is constructed in the form of a pipe including a substantially linearly extending cylindrical inner wall 2 and an outer wall 3 formed into a spirally protruded corrugation having semicircular sectional shape. Specifically, the pressure-withstanding synthetic resin pipe P includes a metallic reinforcement belt plate 5 and a flat metallic belt plate 6 each extending along the inner peripheral surface of a hollow portion 7 defined by the inner wall 2 and a protruded corrugation portion 4 of the outer wall 3 in the confronted state. Opposite edge portions 5a and 5b of the metallic reinforcement belt plate 5 are bent in the outward direction, i.e., in the axial direction of the pressure-withstanding synthetic resin pipe, while opposite edge portions of the flat metallic belt plate 6 are likewise bent in the upward direction to form engagement portions 6a and 6b while the upper parts of the engagement portions 6a and 6b are folded on the upper surfaces of the opposite edge portions 5a and 5b of the metallic reinforcement belt plate 5. With this construction, the metallic reinforcement belt plate 5 is reliably engaged with the metallic belt plate 6 via the opposite edge portions 5a and 5b of the metallic reinforcement belt plate 5 and the opposite engagement portions 6a and 6b of the metallic belt plate 6 in the firmly clamped state.

In this embodiment, as shown in FIG. 3, the metallic reinforcement belt plate 5 is formed prior to forming the pipe by processing a central portion 5a of a flat belt iron plate having a predetermined width to have a downwardly orienting open semicircular cross-sectional contour and by outwardly bending opposite edge portions 5a and 5b so as to exhibit an inverted U-shaped contour. On the other hand, the metallic belt plate 6 is formed by processing a plate having a flat central portion 6c to have the opposite edge portions 6a and 6b bent in the upward direction.

Next, a series of steps for producing a pressure-withstanding synthetic resin pipe P constructed in the aforementioned manner will be described below with reference to FIG. 3 which exemplifies a means for producing the pressure-withstanding synthetic resin pipe P.

i. A flat belt of resin 2A extruded from a resin extruding machine (not shown) or preliminarily extruded from the same for forming the inner wall 2 is spirally wound around a pipe forming unit (not shown) while a left-hand edge portion 2a of a subsequent resin belt 2A is welded or adhesively connected to a right-hand edge portion 2b of a preceding resin belt 2A in the overlapped state. As a result, the cylindrical inner wall 2 is continuously formed.

ii. The metallic belt plate 6 is spirally wound around the connected part of the resin belt 2A defined by both the edge portions 2b and 2a while maintaining the same pitch as that of the resin belt 2A.

iii. The metallic reinforcement belt plate 5 having an inverted U-shaped sectional contour is spirally wound around the metallic belt plate 6 while the opposite edge portions 5a and 5b of the metallic reinforcement belt plate 5 are brought in close contact with the upper surface of the metallic belt plate 6.

iv. Thereafter, the opposite engagement portions 6a and 6b of the metallic belt plate 6 are folded on the opposite edge portions 5a and 5b of the metallic reinforcement belt plate 5 in the overlapped state so that the former are firmly engaged with the latter.

v. Subsequently, a flat belt of resin 3A extruded from an extruding machine (not shown) or preliminarily extruded from the same with a flat belt contour or with the substantially same contour as that of the metallic reinforcement belt plate 5 for forming the outer wall 3 is spirally wound around the metallic belt plate 5 in such a manner as to cover the latter with the resin sheet 3A. At this time, a left-hand edge portion 3a of the resin plate 3A is overlapped on a right-hand edge portion 3b of the preceding wound resin belt 3A so that the former is welded or adhesively connected to the latter. Moreover, the left-hand edge portion 3a of the resin belt 3A is welded or adhesively connected to the inner wall 2. As a result, the outer wall 3 having a spirally extending corrugated contour is continuously formed.

As the aforementioned steps are repeated with positional offset, a pressure-withstanding synthetic resin pipe P having the structure as shown in FIG. 2 can continuously be formed.

Since the pressure-withstanding synthetic resin pipe P is constructed in the above-described manner, any axial expansive deformation of the open ends of the metallic reinforcement belt plate 5 having an inverted U-shaped sectional contour can restrictively be suppressed by the metallic belt plate 6 on the opposite ends thereof. Thus, the metallic belt plate 6 allows the metallic belt plate 5 to satisfactorily stand against any outer pressure exerted on the metallic reinforcement belt plate 5. Further, the metallic belt plate 6 satisfactorily stands against any inner pressure exerted on the pressure-withstanding synthetic resin pipe, and the metallic belt plate 6 satisfactorily prevents the inner wall 2 located on the inner surface side of the metallic belt plate 6, i.e., the inner wall 2 located inside the protruded corrugation portion 4 from axially expanding and deforming.

A series of pressure-withstanding flattening tests were conducted with fifty pressure-withstanding synthetic resin pipes each having the structure as shown in FIG. 2 and produced in the above-described manner. The results derived from these tests are noted in the following.

Each pressure-withstanding synthetic resin pipe P had a length of 1 m, a synthetic resin raw material was polyethylene, the pressure-withstanding synthetic resin pipe P had an outer diameter of 880 mm and an inner diameter of 800 mm, the inner wall 2 located inside the protruded corrugation portion 4 had a thickness of 2 mm, the outer wall 3 had a thickness of 3 mm, the respective iron plates 5 and 6 had a thickness of 1 mm, a distance between the open ends of the metallic reinforcement belt plate 5 was 61 mm, the outer load to be exerted on the pressure-withstanding synthetic resin pipe P was 5000 kg/m, an average quantity of deformation of the pressure-withstanding synthetic resin pipe P (i.e., an average quantity of sinking) from the no-load state (i.e., the state that the pressure-withstanding synthetic resin pipe P had a true circular sectional contour) was 44 mm, the axial expansive elongation of a side portion of the pipe at the open end side of the iron plate 5 was zero, and the axial expansive elongation of the inner wall 2 located inside the protruded corrugation portion 4 was also zero. Consequently, no crack was recognized in the inner wall 2 of each pressure-withstanding synthetic resin pipe P, and moreover, any particular abnormality was not recognized with all the pressure-withstanding synthetic resin pipe P.

To carry out the present invention, an iron plate, a stainless steel plate, a steel plate or the like may be used as the metallic reinforcement belt plate 5 and the metallic belt plate 6 as they are. However, since rusting is liable to occur in the case that the iron plate is used as the metallic belt plates, it is desirable that the iron plate is coated with zinc or tin by employing a plating process. Although illustration is omitted for the purpose of simplification, one surface, the opposite surfaces or the whole surface of the belt plates may be coated with a rust-proofing resin or paint. Otherwise, each belt plate may be coated with a film of synthetic resin or resin paint having excellent adhesiveness to the synthetic resin constituting the pipe wall and a thickness ranging from about 0.01 to 0.5 mm.

Figure 4:
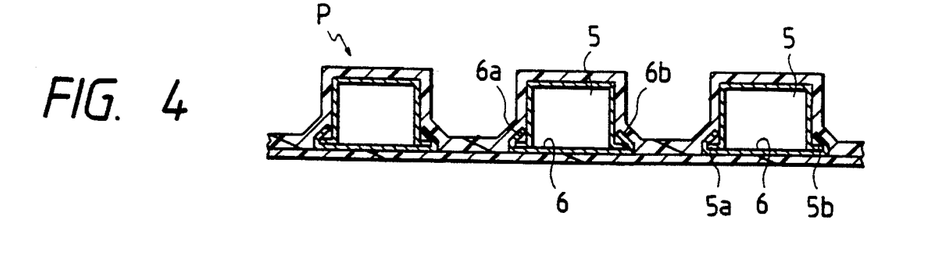
FIG. 4 is a sectional view showing a pipe wall portion of a pressure-withstanding synthetic resin pipe according to a second embodiment of the present invention.

FIG. 4 is a sectional view showing a pressure-withstanding synthetic resin pipe according to a second embodiment of the present invention. Basically, the pressure-withstanding synthetic resin pipe P is produced in the substantially same manner as the first embodiment of the present invention. Specifically, a metallic reinforcement belt plate 5 has an inverted substantially U-shaped sectional contour. The bottom portion of the metallic reinforcement belt plate 5 is flat and the opposite corners of the same are bent at a substantially right angle and the opposite open edge portions 5a and 5b of the same are outwardly bent in the same manner as the first embodiment of the present invention. On the other hand, opposite engagement portions 6a and 6b of a metallic belt plate 6 are slantwise upwardly bent toward the central part of the plate in order to prevent the metallic reinforcement belt plate 5 from expanding and deforming in the axial direction. Other components rather than the aforementioned ones are constructed in the substantially same manner as the first embodiment of the present invention.

Figure 5:
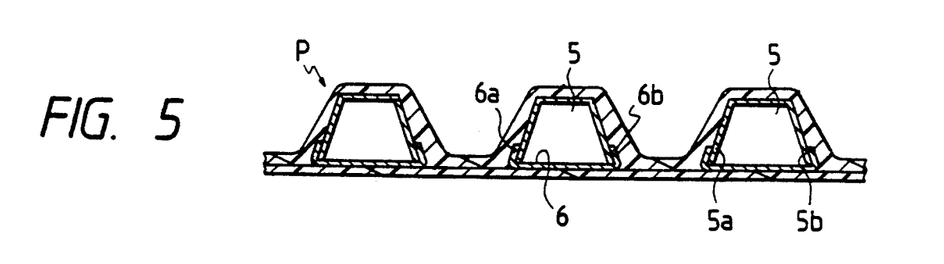
FIG. 5 is a sectional view showing a pipe wall portion of a pressure-withstanding synthetic resin pipe according to a third embodiment of the present invention.

FIG. 5 is a sectional view showing a pressure-withstanding synthetic resin pipe according to a third embodiment of the present invention. The pressure-withstanding synthetic resin pipe P is produced in the same manner as the preceding embodiments of the present invention. In this embodiment, a metallic reinforcement belt plate 5 has a flat bottom portion and opposite foot portions extending slantwise and downwardly from the opposite corners of the bottom portion to the opposite open edge portions 5a and 5b to exhibit a cup-shaped configuration having an inverted substantially U-shaped sectional contour. On the other hand, opposite engagement portions 6a and 6b of a metallic belt plate 6 are slantwise upwardly bent along the open edge portions 5a and 5b of the metallic reinforcement belt plate 5 expanding in a cup-shaped sectional contour in order to prevent the metallic reinforcement belt plate 5 from expanding and deforming in the axial direction. Other components rather than the aforementioned ones are constructed in the substantially same manner as the first embodiment of the present invention. As in the third embodiment, in contrast with the first and second embodiments of the present invention, it is also conceivable that the opposite open edge portions 5a and 5b of the metallic reinforcement belt plate 5 is not outwardly bent in the axial direction.

Figure 6:
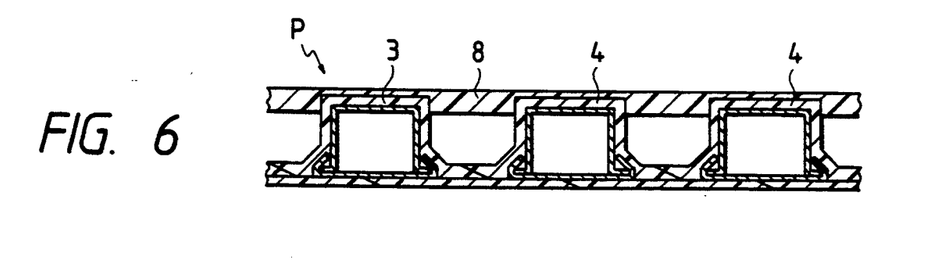
FIG. 6 is a sectional view showing a pipe wall portion of a pressure-withstanding synthetic resin pipe according to a fourth embodiment of the present invention.
Figure 7:
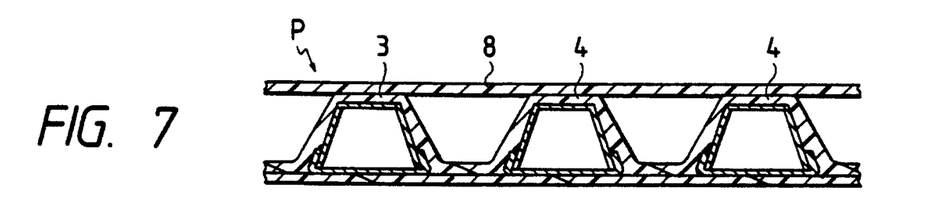
FIG. 7 is a sectional view showing a pipe wall portion of a pressure-withstanding synthetic resin pipe according to a fifth embodiment of the present invention.

FIG. 6 and FIG. 7 are sectional views showing modified structures of a pressure-withstanding synthetic resin pipe P, respectively, wherein the outer peripheral surfaces of the outer wall 3 are covered with a sheath layer 8 of a different kind of cylindrical synthetic resin material. Specifically, FIG. 6 is a sectional view showing a pressure-withstanding synthetic resin pipe P according to a fourth embodiment of the present invention. In this embodiment, the pressure-withstanding synthetic resin pipe P according to the second embodiment of the present invention as shown in FIG. 4 is modified in such a manner that the outer peripheral surfaces of the outer wall 3 are covered with the sheath layer 8 of a different kind of synthetic resin, a thickness of the sheath layer at an outer peripheral surface of each protruded corrugation portion 4 is made thin, and a thickness of the sheath layer at a part between adjacent protruded corrugation portions 4 is made thick. The outer wall 3 is welded or adhesively connected to the sheath layer 8 so that the pressure-withstanding synthetic resin pipe P exhibits a cylindrical configuration.

FIG. 7 is a sectional view showing a pressure-withstanding synthetic resin pipe according to a fifth embodiment of the present invention. In this embodiment, the pressure-withstanding synthetic resin pipe P according to the third embodiment of the present invention as shown in FIG. 5 is modified in such a manner that the outer peripheral surfaces of the outer walls 3 are covered with the sheath layer 8 of a different kind of synthetic resin having a substantially constant thickness across the whole length thereof. The outer wall 3 is welded or adhesively connected to the sheath layer 8 so that the pressure-withstanding synthetic resin pipe P exhibits a cylindrical configuration. In this case, it is not always necessary that the outer wall 3 is welded or adhesively connected to the sheath layer 8. Alternatively, the outer wall may be held in the non-contact state relative to the sheath layer 8.

Figure 8A:
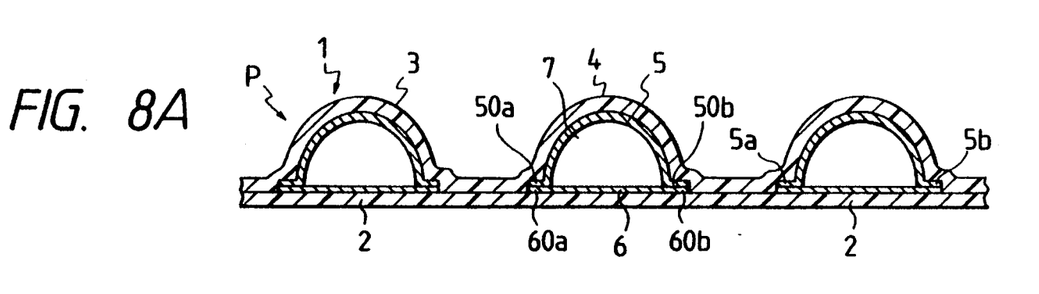
FIG. 8A is a view showing a structure of a pipe wall portion of a pressure-withstanding synthetic resin pipe according to a second aspect of the present invention.
Figure 9:
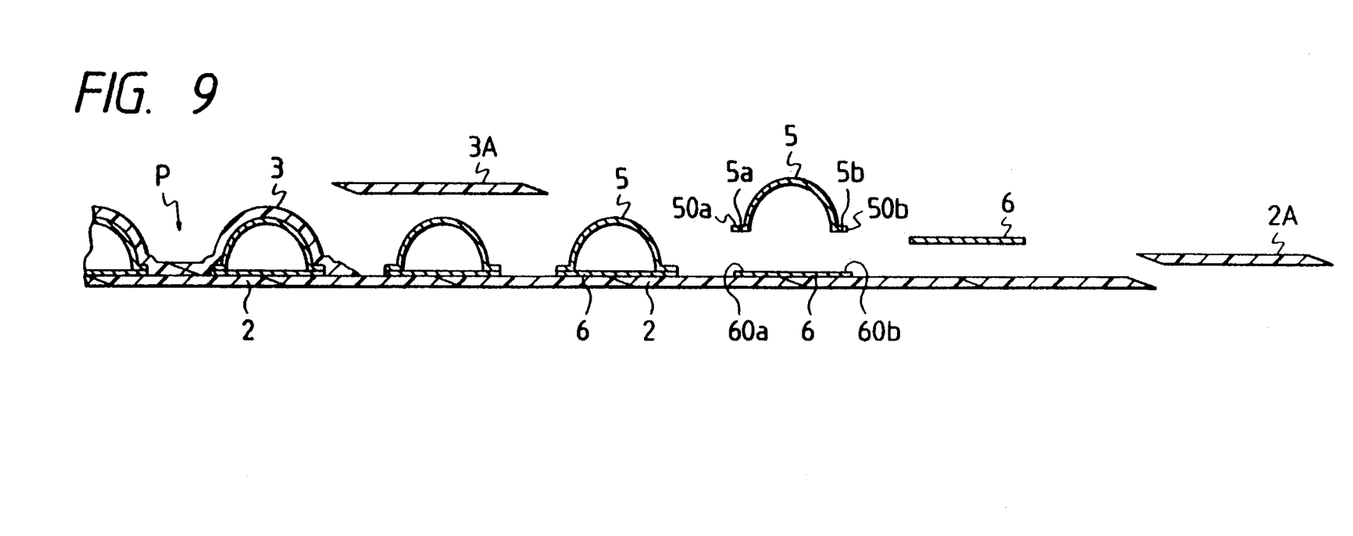
FIG. 9 is a sectional view for explaining a means for producing the pressure-withstanding synthetic resin pipe shown in FIG. 8.

FIG. 8A and FIG. 9 are sectional views showing a pressure-withstanding synthetic resin pipe P according to a second aspect of the present invention. As is best seen in FIG. 8A, a synthetic resin pipe P is constructed in such a manner that a pipe wall 1 includes a substantially linear inner wall 2 and an outer wall 3 formed into a spirally projecting corrugated shape with a semicircular sectional contour in the same manner as the pressure-withstanding synthetic resin pipe according to the first embodiment of the present invention. Specifically, the pressure-withstanding synthetic resin pipe P includes a metallic reinforcement belt plate 5 and a flat metallic belt plate 6, each extending along the inner peripheral surface of a hollow portion 7 defined by the inner wall 2 and the protruded corrugation portion 4 of the outer wall 3. The metallic reinforcement belt plate 5 is formed to have a semicircular section, and open end portions 5a and 5b thereof are bent in the outward direction to form protruded edge portions 50a and 50b. The protruded edge portions 50a and 50b of the metallic reinforcement belt plate 5 are overlapped on opposite end portions 60a and 60b of the metallic belt plate 6 and films coated on the metallic belt plates 5 and 6 are thermally welded to each other so as to allow the overlapped portions of the metallic reinforcement belt plate 5 and the metallic belt plate 6 to be immovably held at the thermally welded portions.

Next, a series of steps of producing the pressure-withstanding synthetic resin pipe P shown in FIG. 8A will be described below with reference to FIG. 9 which schematically exemplifies a means for producing the pressure-withstanding synthetic resin pipe P.

i. The cylindrical inner wall 2 is formed by using a flat resin belt 2A in the same manner as the first embodiment.

ii. The flat metallic belt plate 6 is heated so as to melt a resin film (not shown) formed on the peripheral surface thereof, and thereafter, the hot metallic belt plate 6 is spirally wound around the inner wall 2 while maintaining the same pitch as that of the resin band 2A so that the former is firmly thermally welded to the latter.

iii. The metallic reinforcement belt plate 5 having an inverted U-shaped sectional contour is heated so as to melt a resin film (not shown) formed on the outer peripheral surface thereof, and thereafter, the hot metallic reinforcement belt plate 5 is spirally wound around the metallic belt plate 6 while the opposite edge portions 50a and 50b of the metallic reinforcement belt plate 5 are brought in close contact with the upper peripheral surfaces of the metallic belt plate 6 in the overlapped state, whereby the overlapped surfaces of the metallic reinforcement belt plate 6 and the metallic belt plate 5 are firmly thermally welded to each other.

iv. Subsequently, a resin belt 3A of a flat belt plate for forming the outer wall 3 is spirally wound around and connected to the metallic reinforcement belt plate 5 in such a manner as to cover the latter with the resin belt 3A. At this time, the resin belt 3A is also welded or adhesively connected to the inner wall 2. As the process proceeds, the outer wall 3 having a spirally extending corrugated contour is continuously formed.

Since the pressure-withstanding synthetic resin pipe P is constructed in the above-described manner, any axial expansive deformation of the open ends of the metallic reinforcement belt plate 5 having an inverted U-shaped sectional contour can restrictively be suppressed by the function of the surface connecting force between the metallic reinforcement belt plate 5 and the metallic belt plate 6, so that the pipe can satisfactorily stand against any outer pressure exerted on the metallic reinforcement belt plate 5. In addition, the metallic belt plate 6 can satisfactorily stand against any inner pressure, and axial expansive deformation of the inner wall 2 located on the inner surface side of the metallic belt plate 6, i.e., a portion of the inner wall 2 located inside each hollow portion 7 can be suppressed.

A series of pressure-withstanding flattening tests were conducted with fifty pressure-withstanding synthetic resin pipes each having the structure as shown in FIG. 8A and produced in the above described manner, similarly to the first embodiment of the present invention. The results derived from these tests are noted below.

Each pressure-withstanding synthetic resin pipe P had a length of 1 m, a synthetic resin raw material was polyethylene, a pressure-withstanding synthetic resin pipe P had an outer diameter of 880 mm and an inner diameter of 800 mm, an inner wall 2 located inside the protruded corrugation portion 4 had a thickness of 2 mm, an outer wall 3 had a thickness of 3 mm, respective iron plates 5 and 6 had a thickness of 1 mm, a distance between the open ends of the iron belt plate 5 was set to 61 mm, an outer load exerted on the pressure-withstanding synthetic resin pipe P was 5000 kg/m, an average quantity of deformation of the pressure-withstanding synthetic resin pipe P (i.e., an average quantity of sinking) from the no-load state (i.e., the state that the pressure-withstanding synthetic resin pipe P had a true circular sectional contour) was 44 mm, the expansive elongation of a side portion of the pipe at the open end side of the iron plate 5 was zero, and the expansive elongation of the inner wall 2 located inside the protruded corrugation portion 4 as measured in the axial direction of the pipe P was also zero. Consequently, also in this pipe P, similarly to the pipe according to the first embodiment, no crack was recognized in the inner wall 2 of each pressure-withstanding synthetic resin pipe P, and moreover, any particular abnormality was not recognized with all the pressure-withstanding synthetic resin pipes P.

Figure 10:
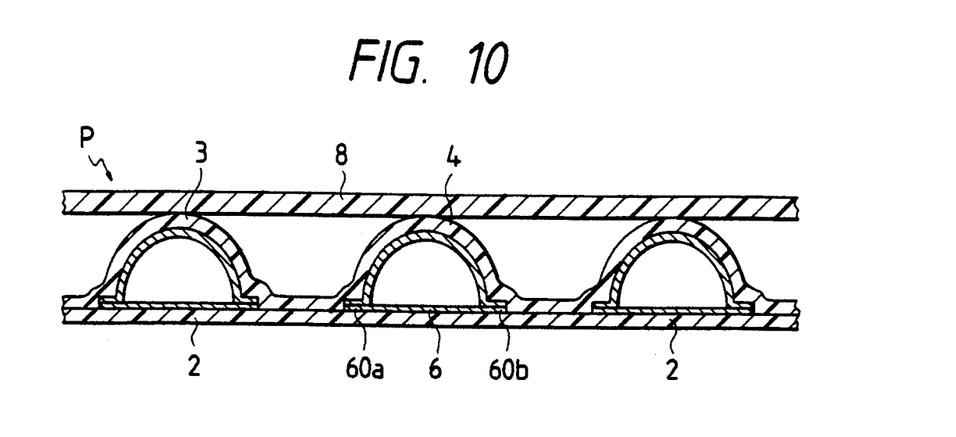
FIG. 10 is a sectional view showing a pipe wall portion of a pressure-withstanding synthetic resin pipe according to a modification of the second aspect of the present invention.

FIG. 10 is a sectional view showing a modified structure of a pressure-withstanding synthetic resin pipe P of FIG. 8A, wherein the outer peripheral surface of the outer wall 3 is covered with a sheath layer 8 of a different kind of cylindrical synthetic resin material.

Figure 8B:
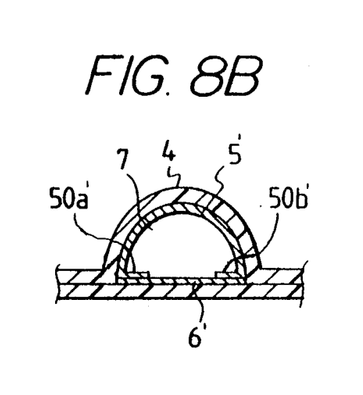
FIG. 8B is a sectional view showing a pipe wall portion having a modified reinforcement belt plate.

As shown in FIG. 8B, the present invention may be carried out in the modified manner such that the protruded edge portions 50a' and 50b' of each metallic reinforcement belt plate 5' are inwardly bent from the open end portions so that they are located below an inverted U-shaped portion.

It is needless to say that various kinds of metallic materials may be employed for the metallic reinforcement belt plates 5 and the metallic belt plates 6, and various kinds of contours may be employed for the U-shaped portions as in the first aspect of the present invention.

A hardness of the synthetic resin constituting the pipe wall of the pressure-withstanding synthetic resin pipe of the present invention is arbitrarily selected depending on the kind of a pressure-withstanding synthetic resin pipe to be produced. It is desirable that the synthetic resin employed for forming the outer wall 3 has a high hardness for the purpose of protecting the metallic reinforcement belt plate 5. On the other hand, as the synthetic resin employed for forming the inner wall 2, a suitable material, for example, a soft raw material, a raw material having wear resistance, or a raw material having chemical resistance is adequately selected depending on the kind of a material flowing through the pressure-withstanding synthetic resin pipe and the physical properties of the same. In the case that the pressure-withstanding synthetic resin pipe produced according to the present invention is used as an underdrain pipe, a plurality of small water collecting holes may be formed in each bottom portion between adjacent protruded corrugation portions 4.

Although the present invention has been described above with respect to several preferred embodiments thereof, it should of course be understood that the present invention should not be limited only to these embodiments but various change or modification may be made without any departure from the scope of the present invention, provided that it is assured that structural requirements of the present invention can satisfactorily be met, the objects of the present invention can satisfactorily be accomplished, and advantageous effects as noted below can be obtained with the pressure-withstanding synthetic resin pipe of the present invention.

As is apparent from the above description, according to the first aspect of the present invention, a metallic reinforcement belt plate having a predetermined width, a predetermined height and a U-shaped sectional contour and a metallic belt plate having opposite end portions bent to form engagement portions are used as essential components so as to allow the opposite ends of the metallic belt plate to be engaged with the open end portions of the metallic reinforcement belt plate, so that axial expansive deformation of the open ends of the metallic reinforcement belt plate can restrictively be suppressed by the metallic belt plate having the opposite ends bent to form engagement portions, and moreover, the metallic belt plate receives an outer pressure exerted on the metallic reinforcement belt plate through the engagement portions formed on the opposite ends thereof. Thus, the present invention has provided a pressure-withstanding synthetic resin pipe having excellent pressure-withstanding properties.

The metallic belt plate having the opposite ends bent to form engagement portions serves to restrictively suppress axial deformation of the metallic reinforcement belt plate and can satisfactorily stand against the outer pressure exerted on the metallic reinforcement belt plate. At the same time, the foregoing metallic belt plate itself can satisfactorily stand against any inner pressure exerted thereon while preventing the inner wall portion located inside the protruded portion from being deformed. Thus, since restriction in view of the strength is not required for a material constituting the inner wall portion, a suitable raw material having excellent wear resistance, excellent chemical resistance or excellent oil resistance can selectively be used in accordance with the kind and physical properties of a substance flowing through the pressure-withstanding synthetic resin pipe.

In addition, according to the second aspect of the present invention, a metallic reinforcement belt plate having a substantially U-shaped sectional contour and the protruded edge portions axially projected outside or inside from the open ends thereof, and a flat metallic belt plate serving as an opponent component for the metallic reinforcement belt plate are used while the projected edge portions of the metallic reinforcement belt plate and the opposite end portions of the metallic belt plate are immovably overlapped on each other. This construction can satisfactorily prevent the open end portions of the metallic reinforcement belt plate from axially expanding and deforming. At the same time, the metallic belt plate receives any outer pressure exerted on the metallic reinforcement belt plate. Thus, the same advantageous effects as those obtainable from the pressure-withstanding synthetic resin pipe according to the first aspect of the present invention are assured with the pressure-withstanding synthetic resin pipe according to the second aspect of the present invention.

I claim:

1. A pressure-withstanding synthetic resin pipe, comprising:
    a pipe wall including a substantially cylindrical inner wall and an outer wall exhibiting a spirally extending corrugated configuration;
    a metallic reinforcement belt plate disposed inside a protruded corrugation portion of said outer wall, said metallic reinforcement belt plate having a substantially U-shaped sectional contour and open end portions; and
    a metallic belt plate disposed at said inner wall, said metallic belt plate having end portions bent to form engagement portions and adapted to be engaged with said open end portions of said metallic reinforcement belt plate.

2. A pressure-withstanding synthetic resin pipe, comprising:
    a pipe wall including a substantially cylindrical inner wall and an outer wall having a spirally extending corrugated configuration;
    a metallic reinforcement belt plate disposed inside a protruded corrugation portion of said outer wall, said metallic reinforcement belt plate having a substantially U-shaped sectional contour and protruded edge portions formed of open end portions axially outwardly or inwardly bent; and
    a flat metallic belt plate disposed at said inner wall, said flat metallic belt plate having end portions overlapping on and adhering to said protruded edge portions.

3. A pressure-withstanding synthetic resin pipe as claimed in claim 1, further comprising a sheath layer of a synthetic resin different from that employed for said outer wall on an outer peripheral portion of said outer wall so that said pressure-withstanding synthetic resin pipe exhibits a substantially cylindrical configuration.

4. A pressure-withstanding synthetic resin pipe as claimed in claim 2, further comprising a sheath layer of a synthetic resin different from that employed for said outer wall on an outer peripheral portion of said outer wall so that said pressure-withstanding synthetic resin pipe exhibits a substantially cylindrical configuration.

5. A pressure-withstanding synthetic resin pipe as claimed in claim 1, wherein said open end portions are bent outwardly in an axial direction of said pipe.

* * * * *